US008713074B2

(12) United States Patent
    Adler (10) Patent No.: US 8,713,074 B2
(45) Date of Patent: Apr. 29, 2014

(54) INSTANCE MANAGEMENT OF CODE IN A DATABASE

(75) Inventor: Dustin Kurt Adler, Rancho Cordova, CA (US)

(73) Assignee: Group-A Autosports, Inc., Norco, CA (US)

( * ) Notice: Subject to any disclaimer, the term of this patent is extended or adjusted under 35 U.S.C. 154(b) by 388 days.

(21) Appl. No.: 13/089,520

(22) Filed: Apr. 19, 2011

(65) Prior Publication Data

US 2011/0196843 A1     Aug. 11, 2011

Related U.S. Application Data

(62) Division of application No. 12/210,629, filed on Sep. 15, 2008, now Pat. No. 7,979,450.

(51) Int. Cl.
    *G06F 17/30*     (2006.01)
(52) U.S. Cl.
    USPC .......... 707/806; 707/736; 707/758; 707/802; 717/110; 717/114; 717/120; 717/124; 717/136
(58) Field of Classification Search
    None
    See application file for complete search history.

(56) References Cited

U.S. PATENT DOCUMENTS

| | | | |
|---|---|---|---|
| 3,411,139 A | | 11/1968 | Lynch et al. |
| 5,361,351 A | | 11/1994 | Lenkov et al. |
| 5,519,859 A | | 5/1996 | Grace |
| 5,548,759 A | * | 8/1996 | Lipe ..................................... 1/1 |
| 5,586,329 A | | 12/1996 | Knudsen et al. |
| 5,819,251 A | * | 10/1998 | Kremer et al. ........................ 1/1 |
| 5,850,554 A | | 12/1998 | Carver |
| 5,854,932 A | * | 12/1998 | Mariani et al. ................ 717/116 |
| 5,987,463 A | * | 11/1999 | Draaijer et al. ........................ 1/1 |
| 6,108,659 A | * | 8/2000 | Vincent .......................... 717/116 |
| 6,205,440 B1 | | 3/2001 | Nusbickel |
| 6,279,151 B1 | | 8/2001 | Breslau et al. |
| 6,629,313 B1 | * | 9/2003 | Rowe et al. .................... 717/136 |
| 7,024,663 B2 | * | 4/2006 | Klein ............................. 717/127 |
| 7,047,249 B1 | * | 5/2006 | Vincent ................................. 1/1 |
| 7,155,426 B2 | * | 12/2006 | Al-Azzawe .......................... 1/1 |
| 7,296,037 B1 | * | 11/2007 | Kruy et al. ........................... 1/1 |
| 7,735,598 B2 | | 6/2010 | Nakamura |
| 8,171,045 B2 | | 5/2012 | Adler |
| 2004/0199547 A1 | | 10/2004 | Winter et al. |
| 2006/0085512 A1 | | 4/2006 | Handel et al. |
| 2007/0038662 A1 | * | 2/2007 | Bendel et al. ................. 707/102 |
| 2010/0042585 A1 | | 2/2010 | Adler |
| 2010/0070448 A1 | | 3/2010 | Omoigui |

OTHER PUBLICATIONS

"Source Code in Database," Wikipedia, http://en.wikipedia.org/wiki/Source_Code_*in*_Database, Feb. 11, 2010.

(Continued)

*Primary Examiner* — Hung Le
(74) *Attorney, Agent, or Firm* — Peters Verny, LLP (57) ABSTRACT

The compiled code of a computer program is stored in multiple pieces within a database. Each piece is optionally stored within a separate data record. Execution of the computer program includes using database queries to retrieve pieces of the compiled code for execution. The database and associated database management logic are used to provide numerous advantages in execution and management of the computer program. For example, in some embodiments, database queries are used to help facilitate program flow logic. In another example, database queries are based on a command line or universal resource locator. These queries may be used to select functionality of a computer program in response to the command line or universal resource locator.

10 Claims, 7 Drawing Sheets

(56) References Cited

OTHER PUBLICATIONS

Green, Roedy, Canadian Mind Products, "SCID," http://mindprod.com/project/scid.html, downloaded Mar. 4, 2011.
"Jade 6," http://www.jadeworld.com/jw/Technologies/High_Performance_Technology/JADE.php, downloaded Mar. 4, 2011.
"What is Zope?" http://www.zope.org/WhatIsZope, downloaded Mar. 4, 2011.
Little, Jim, "Prism Criticism," http://lists.tunes.org/archives/tunes/1999-June/002143.html, Jun. 7, 1999.
Green, Roedy, Canadian Mind Products, "Aubjex: Java Glossary," http://mindprod.com/jgloss/aubjex.html, downloaded Mar. 4, 2011.
Fowler, Martin, "ProjectionalEditing," http://martinfowler.com/bliki/ProjectionalEditing.html, Jan. 14, 2008.
Fowler, Martin, "Language Workbenches: The Killer-App for Domain Specific Languages?" http://martinfowler.com/articles/languageWorkbench.html, Jun. 12, 2005.
Advertisement for "Model Driven Software Development," http://www.amazon.com/gp/product/0470025700, downloaded Apr. 6, 2011.
"Apache Sling," http://mvnrepository.com/artifact/org.apache.sling, 2006.
"Seaside Screenshots," http://www.seaside.st/about/screenshots?_k=qBQqx4pN, downloaded Mar. 4, 2011.
"Smalltalk Source Code Browser," http://stackoverflow.com/questions/1298020/how-useful-would-be-a-smalltalk-source-code-browser-for-other-programming-languag, Aug. 19, 2009.
Shariff, Fahd, "Source_Code_in_Database_SCID," http://www.scribd.com/doc/3010319/Source-Code-in-Database-SCID, May 2003.
"Kiln Features," http://www.fogcreek.com/kiln/features/source-code-control.html, 2000.
"SECO," http://www.kobrix.com/seco.jsp, downloaded Mar. 4, 2011.
Iordinov, Borislav, "Rapid Software Evolution," http://www.kobrix.com/documents/rse.pdf, Oct. 21, 2007.
"HyperGraphDB," http://www.hypergraphdb.org/index, downloaded Mar. 4, 2011.
"Source Code Control | Kiln from Fog Creek Software," http://www.springerlink.com/content/3m226811191wl566/, downloaded Mar. 28, 2011.
"Ruby that Scales," http://ruby.gemstone.com/, downloaded Mar. 4, 2011.
"Gemstone/s Object Server," http://www.gemstone.com/products/gemstone, 1983.
U.S. Appl. No. 12/191,711 non-final Office action, mailed Mar. 16, 2011.
U.S. Appl. No. 12/191,711 Applicant's Amendment A, submitted Jul. 12, 2011.
U.S. Appl. No. 12/191,711 final Office action, mailed Nov. 7, 2011.
U.S. Appl. No. 12/191,711 Appeal Brief, submitted Jan. 9, 2012.
U.S. Appl. No. 12/191,711 Examiner's Answer, mailed Mar. 21, 2011.
U.S. Appl. No. 12/191,711 Reply Brief, submitted May 14, 2012.
PCT/US09/48672 International Search Report and Written Opinion, Jul. 23, 2009.
U.S. Appl. No. 12/183,823 non-final Office action, mailed Aug. 1, 2011.
U.S. Appl. No. 12/183,823 Applicant's Amendment C, submitted Aug. 31, 2011.
U.S. Appl. No. 12/183,823 Applicant's Interview Summary I, submitted Jan. 9, 2012.
U.S. Appl. No. 12/183,823 Applicant's Interview Summary II, submitted Jan. 9, 2012.
U.S. Appl. No. 12/183,823 final Office action, mailed Feb. 23, 2012.
U.S. Appl. No. 12/183,823 Applicant's Amendment D, submitted Mar. 9, 2012.
U.S. Appl. No. 12/183,823 Applicant's Interview Summary III, submitted Jan. 9, 2012.
CN 200980130576.7 First Office Action, mailed Nov. 26, 2012.
CN 200980130576.7 Response to First Office Action, submitted Jun. 13, 2013.

* cited by examiner

INSTANCE MANAGEMENT OF CODE IN A DATABASE

CROSS-REFERENCE TO RELATED APPLICATIONS

This application is a Divisional of U.S. patent application Ser. No. 12/210,629 filed on Sep. 15, 2008 now U.S. Pat. No. 7,979,450 and entitled "Instance Management of Code in a Database" which is incorporated herein by reference. This application is related to U.S. patent application Ser. No. 12/191,711 filed on Aug. 14, 2008 and entitled "Command Interpretation" and to U.S. patent application Ser. No. 12/183,823 filed on Jul. 31, 2008 and entitled "Record Based Code Structure."

BACKGROUND

1. Field of the Invention

The invention is in the field of computing systems, and more specifically in the fields of computer programming and provisioning.

2. Related Art

In a typical computing model source code is generated by a programmer using an editor. This source code may be configured to be interpreted at the time it is executed or compiled into executable code using a compiler. Compiled code typically executes more quickly than interpreted code because the compiling process includes parsing and syntax checking prior to execution. Compiling the code also places the code in a form (e.g., object code) that may be directly executable using an operating system.

The compiled code is stored using a filing system, typically provided with an operating system configured to execute the compiled code. For example, the compiled code may be stored in an ".exe" file for execution within the Windows operating system. The compiled code may be linked to other files containing executable code, data or scripts. This linking may occur prior to or at the time the code is executed. When the code is executed the file system is used to identify the file within which the code is stored and this file is opened and processed by the operating system.

There are several disadvantages to this computing model. For example, modification of the compiled code typically involves recompiling an entire source code or file thereof. If a single function, among many functions, within source code, is modified, then the entire source code, on a file-by-file basis, is recompiled. Further, specific permissions and specific software (e.g., an editor) are required to modify the source code. This can be cumbersome when the editor and code are on different computing devices.

Databases and database programs configured to manage the databases are commonly used to store and access data. Sometimes this data is used by computer programs external to database programs. For example, an external program may use a database program to retrieve data that is then operated on by the external program. Database programs may also include "database stored procedures" which are functions prepared by a user of the database program to operate on a database. Database stored procedures are limited to operating on stored data and are differentiated from other types of computer programs in that these procedures are run under the control of (e.g., within) the database program rather than under direct control of an external operating system.

Compiled code is typically executed using a command line that includes a name of the compiled code, e.g., a program name, and optionally a path to the compiled code. This command line is optionally represented by a graphical icon in a graphical user interface. A command line optionally further includes parameters, sometimes referred to as switches, that are used as input to the compiled code and may be used to control operation of the compiled code. For example, the DOS command line "CD lib" includes a program identifier "CD" and a parameter "lib." The program identifier is used to identify compiled code, which in this case is configured for changing a file directory. The parameter is used to pass, to the compiled code, an identity of the directory to change to.

Compiled code is optionally accessed over a computer network, such as the internet, using a universal resource locator (URL). For example, the URL www.xsevo.com/login.esp may be used to execute a login program hosted at xsevo.com. The URL may also be used to pass parameters to a program. For example, the URL www.xsevo.com/login.esp?lvl=high may be used to pass a value of "high" for a parameter "lvl" to the program login.esp. URLs and command lines may, thus, be used to provide parameters to previously established compiled code.

SUMMARY

Various embodiments of the invention comprise a computing architecture in which executable code, for execution external to a database program, is stored within records of a database. The executable code is retrieved from the database at the time of execution. This executable code typically includes compiled code that is ready for execution on an operating system. In comparison to the prior art, the executable code is managed and accessed via the database program rather than merely via a file system.

Storage of executable code within the records of a database provides a variety of advantages, some of which are provided as examples herein. For example, the code may be easier to manage in a database than a file system. The executable code can be stored with a greater degree of granularity than would normally be practical using a file system. In some embodiments, executable code is stored at a granularity such that individual functions are located in different data records of the database. In some cases this allows for the executable code to be managed, modified or otherwise manipulated at the function level rather than at the file level.

During execution of a computer program, database queries are used to retrieve the stored code from the database. The retrieved code is then executed external to the database and supported by the operating system. The code may be executed one part at a time, each part being separately retrieved from the database. Queries are optionally used to facilitate conditional program flow. For example, a CASE statement that uses a label to direct program flow between a number of alternative paths may be implemented by a database query that uses the label as a query parameter.

Compiled code to be executed is optionally selected using a command including a command line or universal resource locator. For example, objects within a universal resource locator may be used in forming queries on the database of compiled code. The universal resource locator can thus be used to select individual data records including particular code desired by a user. In some embodiments, objects within a command are used to directly map to data records. Some embodiments of the invention include logic configured to parse a command line or universal resource locator. This logic may be further configured to interpret a grammatical structure of the command.

Multiple instances of compiled code, source code and/or other information are optionally stored within the database of compiled code. These instances may include different versions, have different functionality, include development and production versions, be related to different security levels, be associated with different human languages, and/or the like. Database management logic and queries executed thereon may be used to facilitate instance management.

The ability to access different parts of computer program by accessing individual data records in which these different parts are stored may allow for external control or execution of these different parts. For example, an external scheduling program may be used to schedule execution of a subset of a computer program by executing compiled code stored in one or more of the data records according to a schedule.

Various embodiments of the invention include a system comprising: a computing device; operating system logic configured to run on the computing device and stored on a computer readable media of the computing device; a database stored on a computer readable media and including data records configured to store compiled code of a computer program; database management logic configured for accessing the database; and code execution logic configured to retrieve the compiled code from the data records by executing one or more queries on the database management logic, and to execute the retrieved code on the operating system logic.

Various embodiments of the invention include a method comprising: receiving a request to execute a computer program; executing a first query to identify a first database record, of a database, in which a subset of compiled code of the computer program is stored. retrieving first code from the identified first database record as a result of the first query; providing the retrieved first code to an operating system for execution; generating a second query based on a result of the execution of the retrieved first code; using the generated second query to identify a second database record, of the database, in which compiled code of the computer program is stored; retrieving the compiled code from the second database record as a result of the second query; and providing the retrieved compiled code to the operating system for execution.

Various embodiments of the invention include a method comprising: receiving source code of a computer program, the source code comprising a plurality of functions; compiling the plurality of functions, the compiled functions being configured for execution on an operating system; storing each of the compiled plurality of functions in a separate database record; and indexing each of the separate database records using an identifier of the function stored in the database record, the identifiers being configured to select members of the plurality of functions according to program flow logic.

Various embodiments of the invention include a system comprising: a computing device; a database stored on a computer readable medium and including data records configured to store compiled code of a computer program; database management logic configured to access the database; code execution logic configured to retrieve the compiled code from the data records by executing one or more queries on the database management logic, and to execute the retrieved code on the operating system logic; and command interpretation logic stored on a computer readable medium and configured to generate the one or more queries by interpreting a command.

Various embodiments of the invention include a method comprising: receiving a command comprising a command line or a universal resource locator; parsing the command to generate a plurality of database queries; retrieving compiled code from a plurality of data records within a database using the plurality of database queries, different parts of the compiled code being stored in different members of the data records; and executing the retrieved compiled code external to the database in response to receiving the command.

Various embodiments of the invention include a method comprising: reading a first object within a received command line or universal resource locator; identifying the first object as a predefined prefix configured to characterize types of one or more other objects within the received command line or universal resource locator; reading a second object with the received command line or universal resource locator; and identifying the second object as a map to a data record within a database, the data record including compiled code configured to be executed in response to receiving the received command line or universal resource locator.

Various embodiments of the invention include a system comprising: a computing device; operating system logic configured to execute computer programs on the computing device; a database stored on a computer readable medium and including a first data record, a second data record and a third data record; code management logic configured to store a first compiled code in the first data record, to store a second compiled code in the second data record and to store a third data record in the third data record, the first compiled code and the second compiled code comprising different parts of a computer program, the second compiled code and the third compiled code comprising different instances of a part of the computer program; database management logic configured to access the database; and code execution logic configured to select one of the different instances of the compiled code and to retrieve the selected instance of the compiled code from the data records by executing one or more queries on the database using the database management logic, and to execute the retrieved instance on the operating system logic.

Various embodiments of the invention comprise a computer readable medium having stored thereupon: logic configured to receive a code of a computer program; logic configured to divide the code into a plurality of parts; logic configured to store the plurality of parts, each in a separate record of a database; logic configured to modify a member of the plurality of parts to produce a modified instance of the member from an original instance of the member; logic configured to store the modified instance in the database; and logic configured to alternatively select the original instance or the modified instance using a database query.

Various embodiments of the invention include a method comprising: receiving a code of a computer program; dividing the code into a plurality of parts; storing the plurality of parts, each in a separate record of a database; modifying a member of the plurality of parts to produce a modified instance of the member from an original instance of the member; storing the modified instance in the database; alternatively selecting the original instance or the modified instance using a database query; and optionally executing the selected instance.

Various embodiments of the invention include a system comprising: a computing device configured to execute a computer program using operating system logic; a database stored on a computer readable media and including data records configured to store compiled code of the computer program as separate parts; database management logic configured for accessing the database; and scheduling logic external to the computer program and configured to request execution of a subset of the separate parts on the computing device according to a schedule.

DETAILED DESCRIPTION

In various embodiments, the invention includes a computing device on which a computer program is stored within a database, systems and methods of storing and modifying the computer program, systems and methods of executing the computer program, and other features discussed herein. The stored computer program includes compiled code as well as optionally data, scripts, mark-up language, images, source code, or the like. The computer program is optionally stored at a granularity wherein individual functions are store in separate data records. The computer program is executed by retrieving the stored compiled code from the database at the time of execution. In some instances the computer program is part of an internet based application configured to be accessed, modified and/or executed though a browser.

The compiled code is object code or byte code that has been parsed and converted from a human-readable source code form so as to be more efficiently executed by a software interpreter. Byte code may be executed by a virtual machine (e.g., interpreter) or it may be further compiled to machine code. Using byte code a computer program may be executed in two phases, first compiling source code into byte code, and then passing the byte code to a virtual machine. Such virtual machines are portable and exist for popular programming languages such as C, Java, Python, PHP (Hypertext Preprocessor), Forth and Tcl (Tool Command Language). Other examples of byte code include code of the BCPL programming language, p-code of UCSD Pascal, Scheme 48, CLISP, CMUCL, Microsoft.NET Common Intermediate Language, among others. Object code is a representation of source code that has been generated by a compiler or assembler. This code may include binary instructions (machine code), data for use by the code, program symbols, relocation information, debugging information, and/or the like. The compiling of object code or byte code typically includes performing syntax checks on source code and parsing the source code at least one time to generate the object or byte code.

Figure 1:
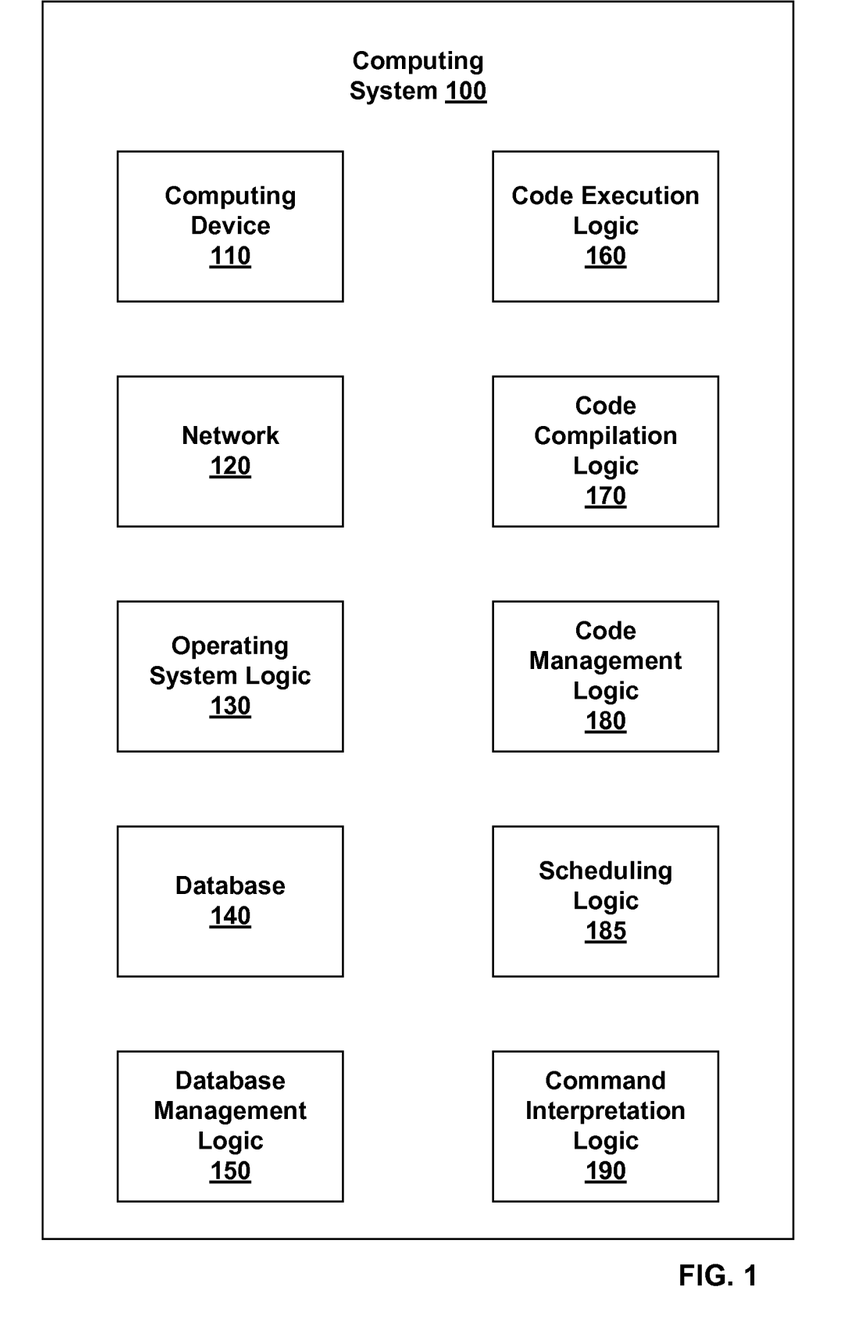
FIG. 1 illustrates a computing system, according to various embodiments of the invention.

FIG. 1 illustrates a Computing System 100, according to various embodiments of the invention. Computing System 100 is configured for the preparation, storage and/or execution of computer programs. As is further described herein, Computing System 100 is optionally a distributed system comprising a plurality of discrete devices configured to communicate together. Computing System 100 comprises at least one Computing Device 110. Computing Device 110 includes hardware such as a processor, memory and input/output configured to execute a computer program. In various embodiments Computing Device 110 comprises a server, a personal computer (PC), a workstation, a portable computing device, or the like.

Computing Device 110 is optionally connected to other computing devices via a Network 120. Network 120 may include the internet, a wide area network, a local area network, or the like. For example, in some embodiments Computing Device 110 includes a server configured to execute a computer program, the output of which is communicated over the internet and presented to a user within a browser. Network 120 may also be configured to facilitate communication between various distributed elements of Computing System 100.

Computing System 100 further comprises Operating System Logic 130. Operating System Logic 130 is optionally stored on a computer readable media within Computing Device 110 and is configured to run on Computing Device 110 so as to support the execution of object code or byte code on Computing Device 110. Operating System Logic 130 is optionally further configured to support a file system on Computing Device 110. Operating System Logic 130 may include, for example, LINUX, UNIX, BSD Unix, Mac OS X, HPUX, Solaris, Microsoft Windows, or the like.

Computing System 100 further comprises a Database 140. Database 140 is typically a relational database stored on computer readable media and may be stored on Computing Device 110 or on some other computing device within Computing System 100. Database 140 comprises data records configured to store compiled code of a computer program. Data records within Database 140 are optionally also configured to store data on which the computer will operate, configuration data related to the computer program, non-compiled computing instructions, and/or the like. For example, non-compiled computing instructions stored in data records of Database 140 may include scripts, mark-up language instructions, source code, code configured to be interpreted in a text format, or the like. Compiled and non-compiled computing instructions may be stored in the same and/or different data records. In some embodiments, Computing System 100 comprises an instance of Database 140 configured to store compiled code and a similar database configured to store related source code. The logical division of compiled code among different data records may be similar to the division of source code among database records. Further details of Database 140 are described elsewhere herein, for example with respect to FIG. 2.

Database 140 is typically managed by Database Management Logic 150 installed on the same computing device as Database 140. Database Management Logic 150 is configured to access (e.g., read or write) records within Database 140 using queries. Database Management Logic 150 may also be configured to control access to Database 140, to define tables of data records within Database 140, to log operations on Database 140, and/or to perform other functions commonly available from database management tools. Database 140 optionally is configured to store compiled code of more than one computer program.

Computing System 100 further includes Code Execution Logic 160. Code Execution Logic 160 is configured to retrieve the compiled code from the data records by executing one or more queries through Database Management Logic 150, and to execute the retrieved code using Operating System Logic 130. Code Execution Logic 160 may be stored on Computing Device 110 or on some other computing device within Computing System 100.

More specifically, Code Execution Logic 160 is configured to formulate queries that are configured to retrieve a next required stored piece of compiled code. For example, when a computer program is first executed, Code Execution Logic 160 may be used to formulate a query configured to identify a data record within Database 140 that includes code of an entry point of the computer program. This query may include an identifier of the program as well as a parameter indicating that the entry point is required. The results of this query comprise the entry point code which is then passed to Operating System Logic 130 for execution. Code Execution Logic 160 is then used to formulate a second query configured to retrieve the next code to be retrieved from Database 140 for execution on Operating System Logic 130. The second query may be formulated after the first query is formulated and/or may be formulated after the first code is executed.

The second query may be formulated shortly after the first query if the program flow following the code retrieved by the first query is known. The program flow is the order in which code will be executed. Program flow may be varied using, for example, conditional branching statements within the computer program. These conditional branching statements include, for example, IF statements, WHILE statements, CASE statements, or the like. If the computer program includes a conditional branching statement, the contents of the second query may be dependent on results of executing the code retrieved using the first query. In some embodiments, therefore, it may not be possible to formulate the second query until after the code of the first query is finished executing.

Sometimes conditional branching statements include a label to which program flow should jump. In systems of the prior art, this label may be converted to a pointer. In some embodiments, the label is used as a parameter in the second query. Within the query, this label is used by Data Management Logic 150 to identify the data record in which the next code to be executed is stored. As a result of this feature, the querying capabilities of Database Management Logic 150 may be used to control program flow within the executed program. This may result in several advantages. For example, a new option (program flow destination) may be added to a conditional branching statement by adding an appropriate data record to Database 140 and indexing the added data record using a label to be included in a query by Code Execution Logic 160. In various embodiments, parameters included in queries are received by Code Execution Logic 160 from a user, from a command line, from a configuration file, from an examination of available hardware, retrieved from a database, web request data, and/or another computer program.

Code Execution Logic 160 may be configured to formulate and execute further queries, following the second query, having similar characteristics. This process may be repeated until program termination.

Computing System 100 optionally further includes Code Compilation Logic 170 configured to generate the compiled code from source code. Code Compilation Logic 170 is optionally a standard compiler configured for compiling source code to byte or object code. Code Compilation Logic 170 is alternatively a customized compiler configured to compile source code to byte or object code, and to output the source code in a piecemeal form including pieces of compiled code that are of appropriate scope for storage in Database 140. For example, Compilation Logic 170 may divide the compiled code into parts at the function (procedure) level, a functional level, by class definition, or into other logical elements. In some embodiments, the compiled code is divided into parts based on program flow within the computer program. In these embodiments, the compiled code may be divided at points where jumps to labels within the code are made. In some embodiments, Code Compilation Logic 170 is configured to automatically compile received source code and then store the compiled code in Database 140. Code Compilation Logic 170 may be stored in Computing Device 110 or some other computing device of Computing System 100. In some embodiments, Code Completion Logic 170 is configured to store definition code for a class in a data record, or alternatively store each class method of a class in a separate data record.

Computing System 100 optionally further includes Code Management Logic 180 configured for modifying and otherwise manipulating the compiled code. In some embodiments Code Management Logic 180 is configured for a user to access source code, retrieve the accessed source code, edit the source code, compile the source code using Code Compilation Logic 170, and/or store the compiled source code in Database 140. Code Management Logic 180 typically uses Database Management Logic 150 for accessing, retrieving, and storing compiled code in Database 140. Database Management Logic 150 optionally further uses Database Management Logic 150 (or an instance thereof) to access source code stored in Database 140 or another database.

Code Management Logic 180 is optionally configured for use within a web browser. For example, Code Management Logic 180 may be configured to communicate with Database Management Logic 150 and/or Code Compilation Logic 170 via the internet. In some embodiments, Code Management Logic 180 is configured to access both compiled code and source code using one or more instances of Database Management Logic 150. For example, if the source code is stored in a database, Code Management Logic 180 may use queries to access this source code. The source code may be stored in a single record or stored in multiple records in a piecemeal fashion. In embodiments wherein the source code is stored in multiple records, Code Management Logic 180 is optionally configured to either present one piece of source code to a user at a time or several pieces of source code to a user at the same time. When several pieces of source code are presented to the user at the same time, the results of queries to the database including the source code may be appended together such that the source code is presented as a continuous body of human-readable text. Code Management Logic 180 is optionally configured to present the source code to a user within an editing environment so that the source code can be modified by the user.

If the source code is edited, Code Management Logic 180 is configured to store the edited source code. This storage may be in a file or in a database. Code Management Logic 180 is further configured to compile the edited source code and store the compiled source code in Database 140. The source code may be compiled in its entirety or in a piecemeal fashion. For example, if only one piece of source code was retrieved from a database and edited, then only this piece of source code may be recompiled and stored, in the compiled form, in Database 140.

Computing System 100 optionally further includes Command Interpretation Logic 190 configured to interpret a received command. Command Interpretation Logic 190 may be stored on a computer readable media within Computing Device 110 and is optionally included in Code Execution Logic 160 and/or Code Management Logic 180. Command Interpretation Logic 190 is configured to receive a command and process this command for execution of executable code. The received command may include a command line or a universal resource locator and typically includes a plurality of interpretable objects.

Code Management Logic 180 is optionally configured for managing different instances of compiled code, source code or other information discussed herein, within the records of Database 140. For example, a first version of compiled code may be stored in a first record and a second version of the compiled code may be stored in a second record. The records optionally include a field configured for storing information that can be used to differentiate between the two instances. This field may include a version identifier, a password, a date, a debug flag, a browser identity, a label, a database issued unique ID (e.g., an integer), a human-readable description, and/or the like.

In some embodiments, different instances of code differ by a change made by a user. For example, a user may edit source code and store the original version in a first record and store the new version in a second record. In some embodiments, different instances of code differ in the way they were compiled. For example, one instance may include debugging information for use in a development mode and one instance may lack the debugging information as would be desired in a production mode. In some embodiments, different instances of code differ in a manner relating to security levels or privileges. For example, different instances may be selected depending on whether a user is logged on, a password, an identity and/or privileges of a user, a network security protocol, an internet protocol address, a MAC address, and or the like. In some embodiments, different instances of code differ in the human languages they are associated with. For example, one instance may be configured to parse english characters and another instance may be configured to parse chinese characters. Instances may differ in other types of functionality, e.g., in how calculations are made, in features offered to a user, in an interface style, in browsers they support, in hardware they support, and/or the like.

Code Management Logic 180 is optionally further configured to manage multiple instances of information other than code in different records of Database 140. For example, different instances of configuration data, style sheets, display text, may be stored in different records. These instances may be selected based on available hardware, a browser type, a preferred human language, and/or the like. For example, a particular instance of configuration data may be selected responsive to information received regarding available hardware, a target operating system, user preferences, and/or the like.

In some embodiments, instances of different parts of a computer program are logically grouped into an instance set. An instance set is a plurality of instances that are configured to operate together. For example, if a computer program includes a plurality of parts and some of these parts are modified, the modified parts may be dependent on each other. Using an original instance of a first part in combination with a modified instance of a second part may result in an error. In some embodiments, Code Management Logic 180 is configured to group instances that are modified during the same event into an instance set. This grouping is optionally automatic. The records of Database 140 optionally include a field configured to store one or more tags identifying membership in an instance set. An instance may be a member of more than one instance set. An instance set may be selected using a prefix or a map, discussed elsewhere herein.

In some embodiments, Code Management Logic 180 is configured to use features of Database Management Logic 150 to help manage various instances. For example, an event logging feature included in Database Management Logic 150 is optionally used to track instances within Database 140. In another example, a rollback feature included in Database Management Logic 150 may be used to restore previous instances.

The ability to execute, store and manipulate parts of a computer program at more granular level than is possible in the prior art may have numerous advantages. For example, if two different versions of a computer program are needed then, in the prior art, then two copies of a source file and an executable file are kept. If the differences between the versions of the computer program occur in just one or two functions, then in some embodiments of the invention multiple instances of only these functions must be stored.

Some embodiments of the invention include a Scheduling Logic 185. Scheduling Logic 185 is configured to allow execution of functions of a computer program according to a schedule. Scheduling Logic 185 may be used to schedule this execution on a function-by-function basis. For example, Scheduling Logic 185 may send a request to Code Execution Logic 160 to request execution of a particular function stored in a record of Database 140. This is optionally done without executing any other parts of a computer program of which the function is a part. Scheduling Logic 185 may be executed on a database server, a web server, a client device, or the like, and may be executed on a device separate from Database 140 or Computing Device 110.

Interpretable objects within a command may include, for example, a predefined prefix, a map to Database 140, and/or static values. A predefined prefix is an object used to characterize subsequent objects. For example, a predefined prefix may be used to indicate that the next three objects within the command should be treated as a map and two values, or some other combination of objects. An object specified by a predefined prefix may be another predefined prefix. This results in a hierarchical relationship between objects within the command. The use of predefined prefixes also allows the command to be interpreted as a grammatical structure. E.g., a structure in which the interpretation of objects can be dependent on other objects within the command, rather than merely a static template. In some embodiments, the grammatical structure allows a command to include phrases of related objects.

A map object is an object that maps to a data record within Database 140. In various embodiments, a map object includes an index to a particular data record and/or may be used to select a plurality of data records. Because a map object maps to one or more data records within Database 140, the map object may be used to select particular executable code for execution. For example, a map object may be passed to Code Execution Logic 160 for inclusion in a query. The passed map object may be configured to select one of a plurality of alternative functions for execution. In some embodiments, a map object may also serve as a predefined prefix. For example, a map object may be used to select data records within Database 140 and also to characterize subsequent objects within a command. A value object includes a static value such as a string, character, integer, floating point number, or any other simple or compound data type. A map object may include database references that establish a many-to-many relationship between a set of maps and compiled code stored in Database 140. A map object may map to a data record that includes a stored map object. This stored map object may map between identifiers and compiled code stored in Database 140.

The use of various objects with a command is illustrated by an example using the universal resource locator "http://xsevo.com/itemA/1/itemB/2/edit_production." This command includes protocol information "http," and a string "xsevo- .com" convertible to an internet protocol (IP) address. This command further includes 5 objects that are interpreted by Command Interpretation Logic 190. These objects may be interpreted in a variety of different ways responsive to any predefined prefixes that may be included among the objects.

For example, "itemA" may be a predefined prefix that specifies that one value object should follow, a predefined prefix that specifies that a value object and a second predefined prefix should follow, or a predefined prefix that specifies that three value objects should follow. The predefined prefix may specify the data type of a value object. For example, "itemA" may specify that the first value object "1" is to be treated as an integer and the second value object "itemB" is to be treated as a string. The objects defined by a predefined prefix are considered a grammatical phrase of that predefined prefix.

If the object "itemB" is also a predefined prefix it may be part of the grammatical phrase of "itemA" or the start of second independent grammatical phrase. When a second predefined prefix is part of a grammatical phrase defined by a first predefined prefix a hierarchical relationship between the predefined prefixes exists. The second predefined prefix and any objects defined by the second object may be considered daughters and/or granddaughters of the first predefined prefix.

In some embodiments a predefined prefix includes a mixture of data type designations and other objects. For example, a predefined prefix may include a data type designation for another object within a command and also a static value, a map, or some another predefined prefix. In one embodiment a predefined prefix includes a first string type designation, an integer type designation, a static Boolean, and a map.

Typically, Command Interpretation Logic 190 is configured to parse a command by considering one object at a time and treating each object as a function of any previously considered predefined prefixes. A predefined prefix is typically defined before receipt of a command, for instance, by a user such as a programmer. Predefined prefixes may be stored in a location accessible to Command Interpretation Logic 190. Command Interpretation Logic 190 is configured to compare objects within a command with these stored predefined prefixes.

In some embodiments, when an object within a command is not recognized as a predefined prefix, and is not an object characterized by a predefined prefix, then the object is considered to be a map. For instance, in the example universal resource locator discussed above the object "edit_production" may be a map to a data record within Database 140. As a map, "edit_production" is passed to Code Execution Logic 160 where the object is used to generate a query. This query is then applied to Database 140 using Database Management Logic 150. In some embodiments, a map is used directly in a query as a search term. In the example discussed above, the map "edit_production" may map to compiled code configured for editing source code in a production mode. An alternative map, such as "edit_development" may map to compiled code configured for editing source code in a development mode. The objects "itemA," "1," "itemB," and "2" could be used to identify the source code to be edited, version information, access requirements, editor options, login information, or the like.

In some embodiments, map objects and/or predefined prefixes are of two general kinds. Objects of a first kind are configured to be used in an exact match comparison, while objects of a second kind are configured to be used as a regular expression. A regular expression is a flexible means of identifying objects, such as text strings. For example, a regular expression "edit\d" includes a wildcard character "\d" and may be used to match text strings "edit1", "edit2", or the like. A regular expression may be used in a received command line or universal resource locator, in a stored predefined prefix, or in a data record. A regular expression may be contrasted with an exact expression, which is an expression that is configured for making an exact match.

A regular expression may be configured to be compared with an entire command line or an entire universal resource locator. Alternatively, a regular expression may be configured to be compared with a subset of a command line or universal resource locator. For example, a regular expression may be matched with a single object or a grammatical phrase within a command. A regular expression is optionally used to separate an object received as part of a command into two parameters. For example, a received object "edit6" may be matched to a predefined prefix "edit\d". In this case, the "edit" and the "6" of the received object may be separated and used independently. Specifically, a map "edit(?P<Id>\d) can be used to pass a parameter Id=6 to target code when matched against the string "edit6". Among other advantages, this may allow for easy reference to several different versions of a compiled code to which the "edit" object is mapped.

Command Interpretation Logic 190 is optionally configured for the inheritance of attributes between elements of a received command. For example, parsing of the command may be viewed as a parse tree and attributes may be inherited (up and/or down) this tree. Values in a child object may override values set in a parent object, or vice-versa. For example, a command comprising/itemA/itemB/edit_production," where itemA and ItemB are each prefixes and edit_production is a map, may use the prefixes itemA and itemB to each set one or more parameters which are passed to edit_production. One or more of the parameters set by itemA may be overridden by itemB. ItemB may override a subset of the parameters set by itemA.

Command Interpretation Logic 190 is optionally distributed among several parts of Computing System 100. For example, part of Command Interpretation Logic 190 may be included in Code Execution Logic 160 and part of Command Interpretation Logic 190 may be included in Code Management Logic 180.

Figure 2:
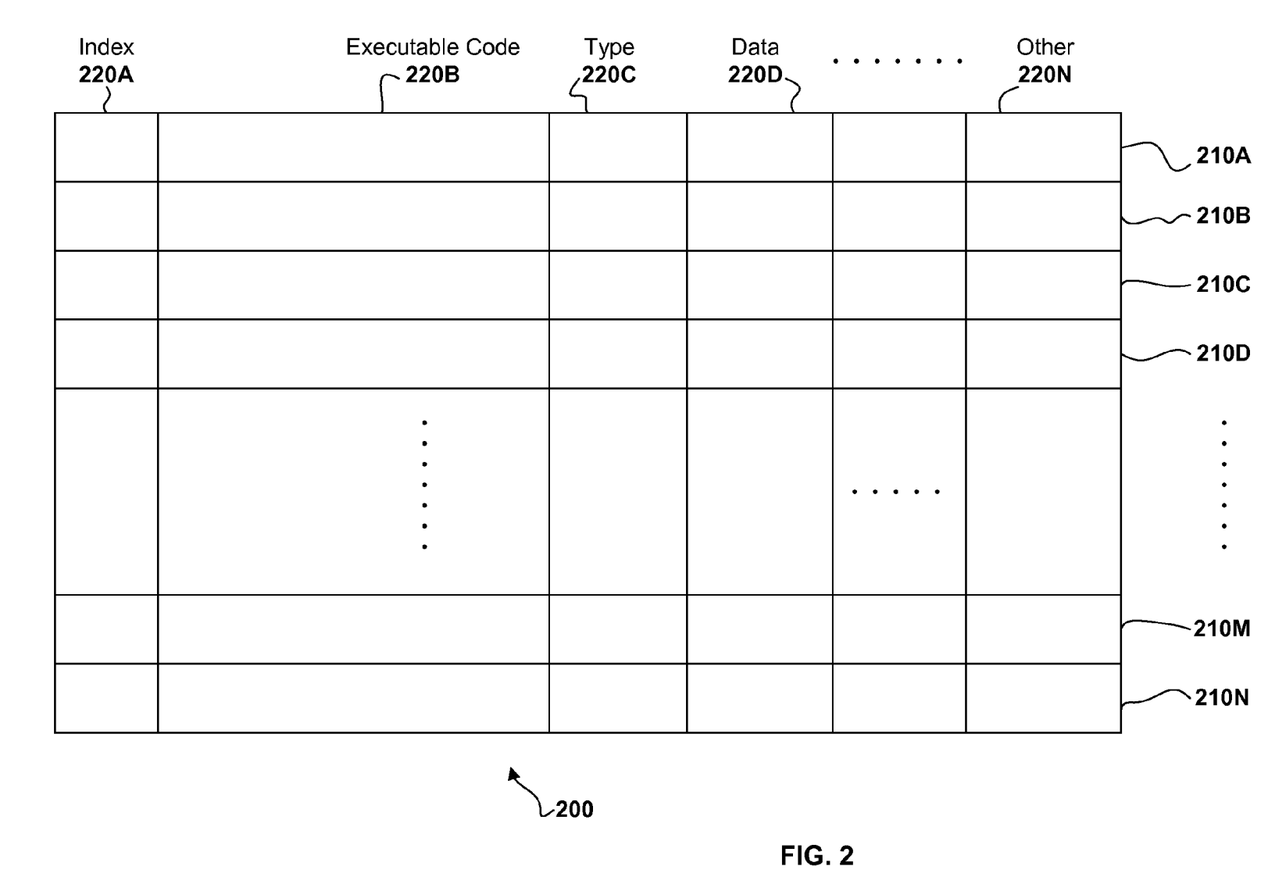
FIG. 2 illustrates a data structure, according to various embodiments of the invention.

FIG. 2 illustrates a Data Structure 200 as may be included in Database 140, according to various embodiments of the invention. Data Structure 200 comprises a plurality of Records 210, individually labeled 210A, 210B, ... 210N. Data Structure 200 may include any number of Records 210. Each of Records 210 comprises a plurality of Data Fields 220, individually labeled 220A, 220B, ... 220N. Each of Records 210 may include more or fewer Fields 220 than illustrated in FIG. 2. These Fields 220 are accessible, readable and writable using queries executed by Database Management Logic 150. Typically, several instances of Data Structure 200 are included in Database 140. Each of Data Structure 200 is optionally stored in a different file. The order of Data Fields 220 illustrated in FIG. 2 may be varied in alternative embodiments.

In an exemplary embodiment, a Field 220A is configured to store a record index value. The index value is typically a unique identifier configured to identify a particular data record. The index value is optionally used as a label to control program flow. A Field 220B is configured to store a piece of executable code or source code of a computer program. As discussed elsewhere herein, this code may be stored on a line-by-line basis, on a function basis, on a functional basis, on a basis based on program flow, or some other basis for dividing the computer program into separate pieces.

An optional Field 220C is configured to store a data or function type. This type may be the type of a value (or object) expected by the code stored in Field 220B, or the type of a value (or object) returned by the code stored in Field 220B.

An optional Field 220D is configured to store data on which the code stored in Field 220B is configured to operate on. For example, Data Field 220D may include constants for use by the stored code.

Records 210 may include a wide variety of additional fields, represented in FIG. 2 by Field 220N. One or more Fields 220N may include fields configured to store: further labels configured to control program flow, a label (or index vale) of a subsequent piece of code, a version identifier of the code stored in Field 22B, configuration information, mapping information, scheduling information, a human readable description or explanation of the code, organization information for an editor, or the like.

Database 140 is typically stored in one or more tables each including an instance of Data Structure 200. These tables are optionally combined using a JOIN instruction or the like. For example, in some embodiments code is store in a first database table that includes function types, function names, function parameters and default data, a second table that includes source code for each instance of a function, and a third table that includes compiled byte code (or the like) of each function instance.

Figure 3:
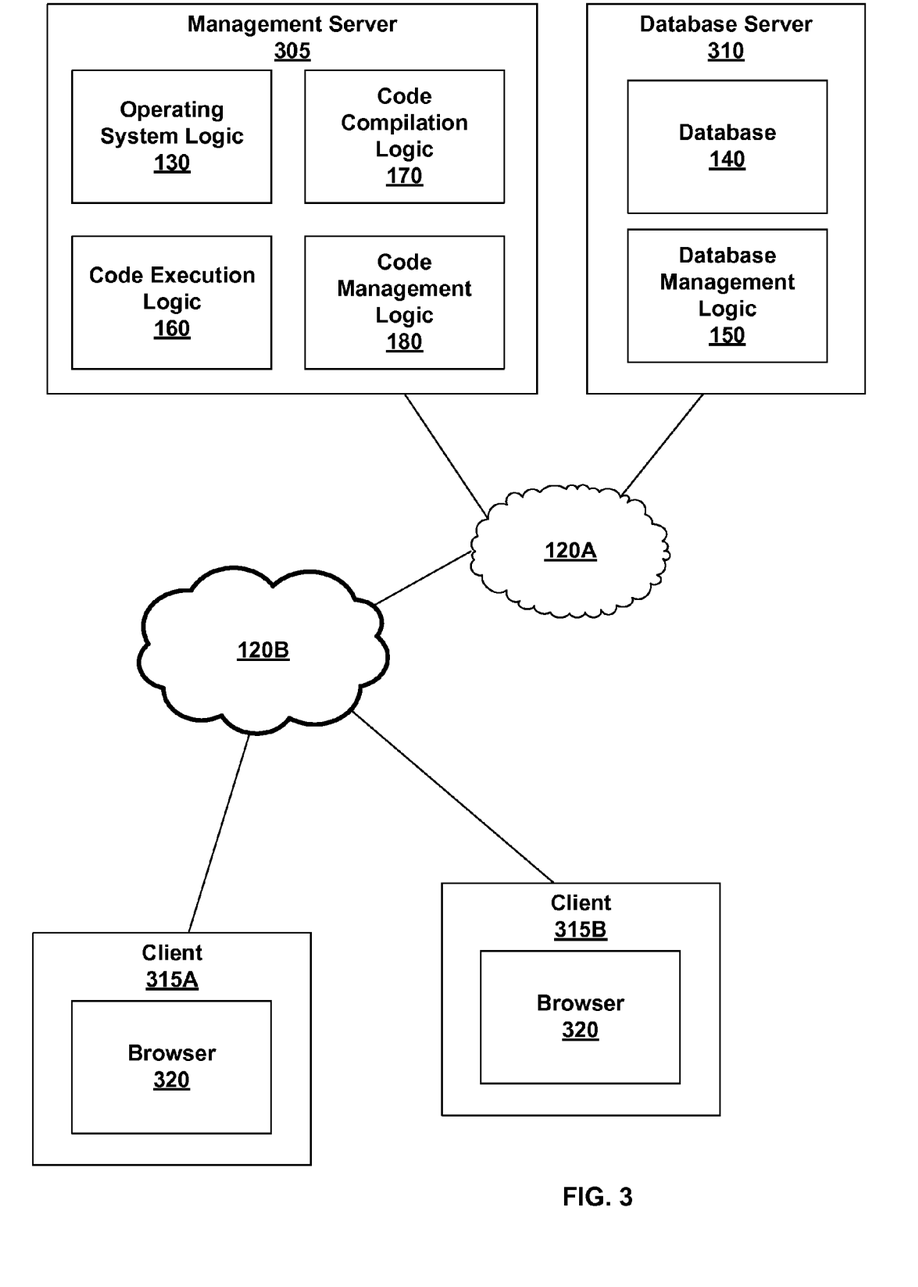
FIG. 3 illustrates a distributed computing system, according to various embodiments of the invention.

FIG. 3 illustrates distributed embodiments of Computing System 100. In these embodiments Computing System 100 is divided into, for example, a Management Server 305 and a Database Server 310. Management Server 305 includes Operating System Logic 130, Code Execution Logic 160, and optionally Code Compilation Logic 170 and Code Management Logic 180. Database Server 310 includes Database 140 and Database Management Logic 150. Management Server 305 and Database Server 310 are configured to communicate with each other through part of Network 120, for example a Local Area Network 120A. Management Server 305 is optionally configured to communicate with more than one instance of Database Server 310. Each of these instances may be configured to support one or more different computer programs. In some embodiments, one instance of Database 140 is treated as a master database and other instances of Database 140, optionally stored on separate devices, are treated as slave databases. For example, the master database may be considered the most current state of the data while the slave databases are reproductions of the master.

Management Server 305 is further configured to communicate with one or more Clients 315, referred to herein as Client 315A, Client 315B, Client 315C, etc. This communication may be through another part of Network 120, for example Internet 120B. In some embodiments, Management Server 305 is configured to be accessed by users of clients via an internet Browser 320, e.g., Internet Explorer or Firefox. This access may include execution of computer programs stored in Database 140 and/or development and modification of these computer programs.

Figure 4:
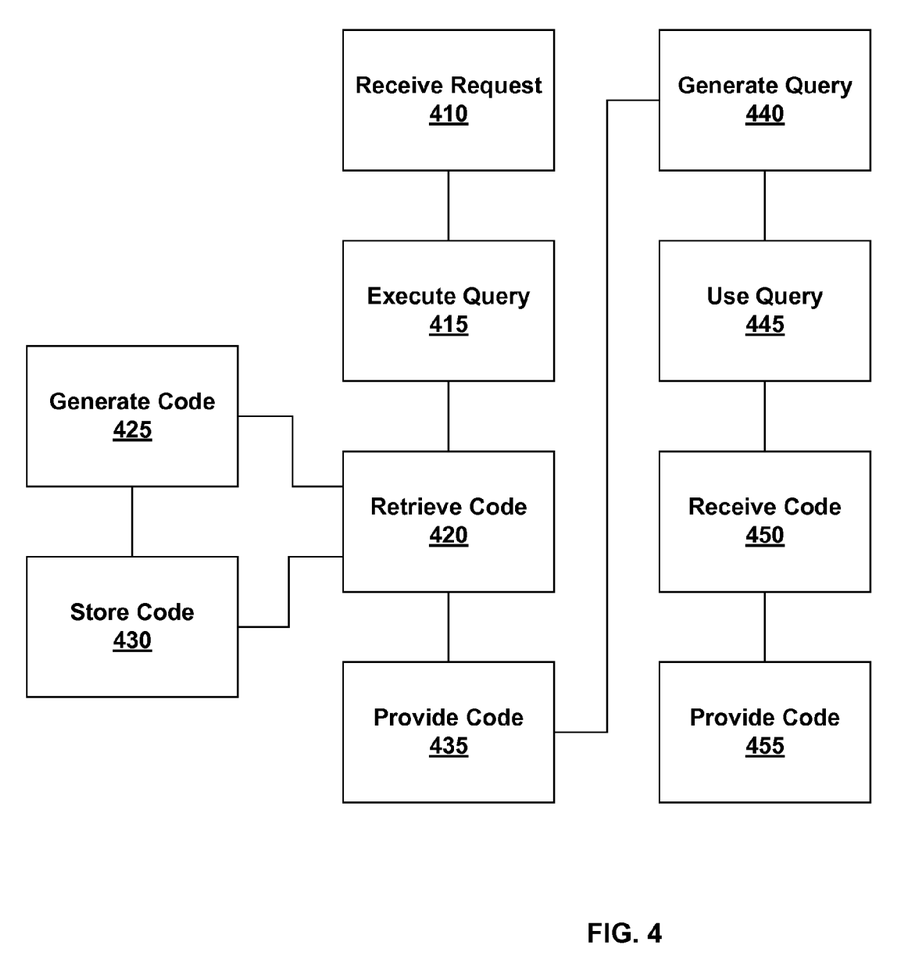
FIG. 4 illustrates methods of executing a computer program, according to various embodiments of the invention.

FIG. 4 illustrates methods of executing a computer program, according to various embodiments of the invention. As described elsewhere herein, the computer program is executed by retrieving executable code from a database, and executing this retrieved code on an operating system external to the database. These methods may be performed using Computing System 100, optionally in response to communications received from Clients 315. The steps illustrated in FIG. 4 may be performed in alternative orders.

In a Receive Request Step 410 a request to execute a computer program is received by Computing System 100. This request may be received from another computing device, from a user of Management Server 305 or from a user of one of Clients 315. In some embodiments the request is received via Browser 320, includes a universal resource locator (URL), and/or is communicated via HTTP, is communicated via TCP/IP, and/or is provided using a POST operation. In addition to information identifying the computer program, the request optionally includes other data such as security information, configuration data, version information, uploaded file data, an image, video, or the like.

In an Execute Query Step 415 a query is provided to Database Management Logic 150. This query is configured to retrieve a subset of the compiled code of the computer program from one of Records 210 within Database 140. The query may be a predetermined query or may be configured in response to data received as part of the request.

In a Retrieve Code Step 420 the execution of the query executed in Execute Query Step 415 results in the retrieval of a first piece of code from Database 140. This first piece of code is a subset of the code of the computer program. As discussed elsewhere herein, the retrieved code may be a single function, a single functional unit, a block of code between conditional branches in a program flow, a single line of code, or other division of the total code of the computer program.

If the retrieval of code in Retrieve Code Step 420 fails, e.g., if the code is not available, then in an optional Generate Code Step 425 the compiled code is generated from source code using Code Compilation Logic 170. This generated code is then stored in one of Records 210 of Database 140. Generate Code Step 425 may include all or a subset of the total code of the computer program. If all of the code is generated, then different parts of the generated code are stored in different Records 210.

In an optional Store Compiled Code Step 430 any code generated in Generate Code Step 425 is stored in one or more Records 210 of Database 140 using Database Management Logic 150. Retrieve Code Step 420 is then attempted again. This storage may occur in an original copy of Database 140 or a cached copy of Database 140. A cached copy is optionally created by Code Execution Logic 160 or other elements of Computing System 100.

In a Provide Code Step 435, the executable code retrieved in Retrieve Code Step 420 is provided to Operating System Logic 130 for execution. This execution typically is not dependent of Database Management Logic 150. For example, as illustrated in FIG. 3, Operating System Logic 130 and Database Management Logic 150 are optionally included on different computing devices. The code is, thus, optionally executed on Operating System Logic 130 remote from Database Management Logic 150.

In a Generate Query Step 440, a second query is generated. This query is configured to retrieve further code of the computer program from Database 140. The second query is optionally based on a result of the execution of the retrieved first code. For example, the execution of the retrieved first code may generate a value that determines program flow, e.g., the object of a subsequent IF or CASE statement. This value may then be included in the second query as a parameter.

In a Use Query Step 445, the generated second query is used to identify a second of Records 210 of Database 140. This second of Records 210 may include compiled code of the computer program, other executable code, non-compiled code, data, scripts, mark-up language, images, source code, and/or the like.

In a Receive Code Step 450, executable code is received from the second database record as a result of the second query. This code is received by a computing device including Operating System Logic 130, for example Management Server 305. The executable code is optionally received via Network 120.

In a Provide Code Step 455, the executable code received in Receive Code Step 445 is provided to Operating System Logic 130 for execution. This execution is optionally independent of Database Management Logic 150, although the execution may generate a result that is later used to access Database 140 using Database Management Logic 150. As such, the Steps Generate Query 440 through Provide Code 455 may be repeated to retrieve and execute multiple pieces of code from Database 140. This process may continue until the computer program is terminated.

Figure 5:
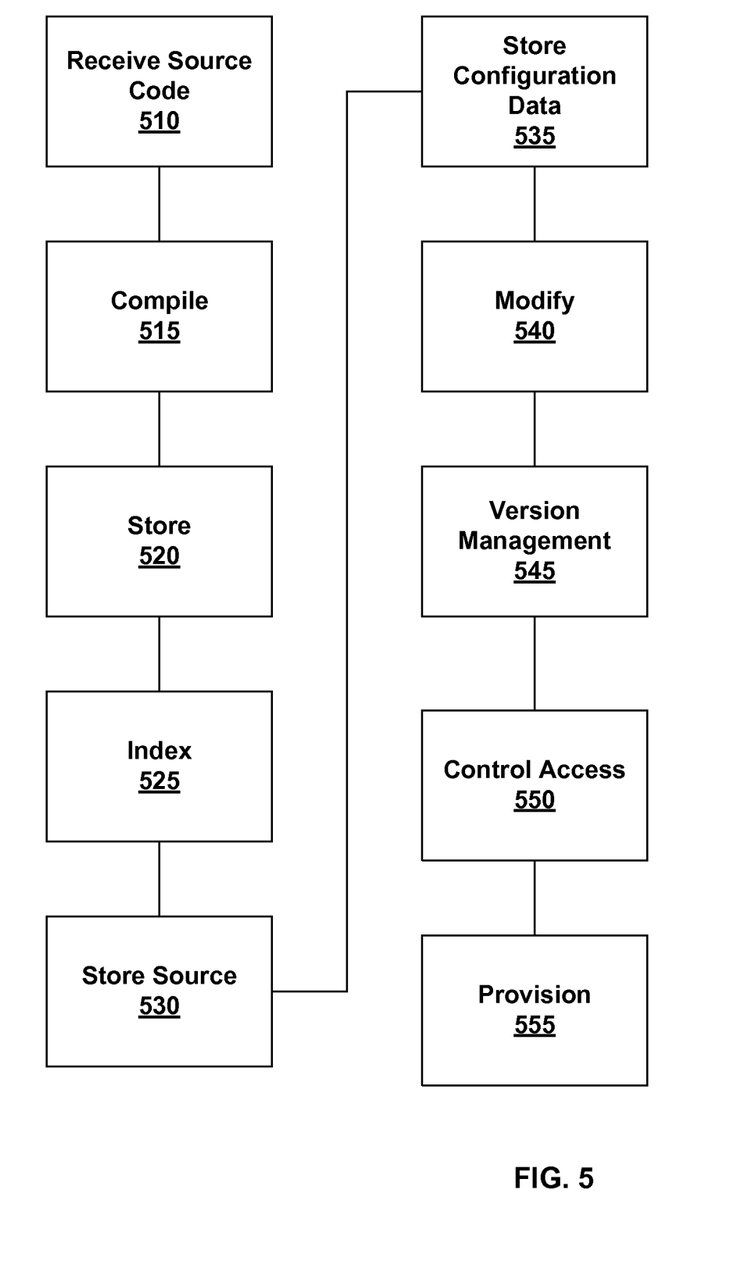
FIG. 5 illustrates methods of creating and modifying a computer program, according to various embodiments of the invention.

FIG. 5 illustrates methods of creating and modifying a computer program, according to various embodiments of the invention. In these methods source code is received and compiled. The compiled code is stored in an indexed manner in multiple pieces within Records 210. The method optionally includes further steps in which the source code or other data are stored, the stored compiled code is modified, the Database Management Logic 150 is used to provide additional features, and/or the database computer program is provisioned by supplying a copy of Database 140. The steps illustrated in FIG. 5 may be performed in alternative orders.

In a Receive Source Code Step 510, the source code of a computer program is received by Computing System 100. The computer program may be received from a storage device, from another computing device via Network 120, or from a user entering text. The received source code typically includes a plurality of functions.

In a Compile Step 515, the source code received in Receive source Code Step 510 is compiled using Code Compilation Logic 170. This step may include generating a single block of compiled code or generating multiple pieces of compiled code divided as discussed elsewhere herein. For example, Code Compilation logic 170 may be used to divide the compiled code into pieces that can be separately stored in Records 210 of Database 140. For example, in some embodiments, Code Compilation logic 170 is used to produce separate pieces of compiled code based on functions or program flow of the source code. The compiled code generated in Compile Step 515 is configured for execution on Operating System Logic 130 and is typically in byte code, object code, machine code, and/or the like.

In a Store Step 520, the compiled code generated in Compile Step 515 is stored in Records 210 of Database 140. Each piece of the compiled code is optionally stored in a separate member of Records 210. If the code was generated in multiple pieces in Compile Step 515 then these pieces can typically be stored directly. However, if Compile Step 515 results in a single block of compiled code, then Store Step 520 includes dividing this block into separate pieces. This division may be performed using Code Management Logic 180 and typically includes dividing the code up on one or more of the basis discussed elsewhere herein.

Store Step 520 optionally includes storing further information, in addition to compiled code. For example, Store Step 520 may include storing other executable code, configuration code, data to be operated on by the code, data type information, or any of the other information discussed herein.

In an Index Step 525, the members of Records 210 in which compiled code are stored are indexed. The indexing process is typically performed using Code Management Logic 180 and/or Database Management Logic 150. The indexing is configured for the identification and retrieval of the stored compiled code and optionally other information. Each separately stored piece of code is typically associated with a unique index or set of indexes. Thus, each piece of code may be identified using the indexing. In some embodiments, Index Step 525 includes adding labels (or other identifiers) meaningful to program flow to Records 210. For example, a label added in Index Step 525 may identify a piece of code as a program flow destination following a conditional statement.

In an optional Store Source Step 530, the source code received in Receive Source Code Step 510 is stored. The source code is optionally stored in pieces with the compiled code in Database 140, or in pieces in a separate database having a structure similar to that of Database 140, e.g., where Field 220 is used to store source code rather than compiled code. Alternatively, Store Source Step 530 may include storing the source code in a conventional text file.

In an optional Store Configuration Data Step 535, configuration data is stored in Database 140. This configuration data is configured for providing a user with alternative configurations of the computer program represented by the received source code. For example, in some embodiments, more than one set of configuration data is stored in Database 140, each set in a different data record. A query executed using Database Management Logic 150 may then be used to retrieve a configuration desired by a user or appropriate for a specific hardware target, or the like.

In an optional Modify Step 540, compiled code within Records 210 is modified. This modification process may include altering the stored source code or receiving new source code, compiling the altered or new source code, and replacing compiled code stored in one or more of Records 210 with the new compiled source code. Modify Step 540 may be performed using Code Management Logic 180 to modify the source code, Code Compilation Logic 170 to compile the source code, and Database Management Logic 150 to store the new compiled code in one or more of Records 210.

Modify Step 540 is optionally performed on one piece of the compiled code at a time. For example, the modification may be made to compiled code stored in only one or a subset of Records 210. Other compiled code, of the same computer program, need not necessarily be recompiled. As such, the modification and recompiling may be limited to a single piece of code separated from other code on the basis of function, functionality, program flow, or the like. In some embodiments Code Compilation Logic 170 is configured to operate in a production mode and a development mode. A greater amount of the compiled code is recompiled in the production mode relative to the development mode, after modification of the code.

In an optional Version Management Step 545, version control of the stored compiled code, and other parts of the computer program are performed using logging capabilities of Database Management Logic 150. For example, in some embodiments, Database Management Logic 150 includes a logging feature configured to log changes in Database 140. This feature may be used to track changes in the computer program. Likewise, Database Management Logic 150 may have a rollback feature configured to return the database to a previous state. This feature may be used to restore previous versions of code. In some embodiments, Database Management Logic 150 is configured to keep multiple copies of Database 140 or individual Records 210 and to track these copies using version information.

In an optional Control Access Step 550, access control features of Database Management Logic 150 are used to control access to the computer program or features thereof. For example, Database Management Logic 150 may be configured to control access to particular Records 210 or sets thereof within Database 140 (or control access to Database 140 in its entirety). This access control can be used to prevent a user from accessing pieces of compiled code associated with specific functionality, specific data, images, or any other aspect of the computer program.

In an optional Provision Step 555, the computer program is provisioned to a computing device by providing a copy of Database 140 to that computing device. This provisioning may occur over Network 120. The step takes advantage of the fact that, in some embodiments, Database 140 is portable.

Figure 6:
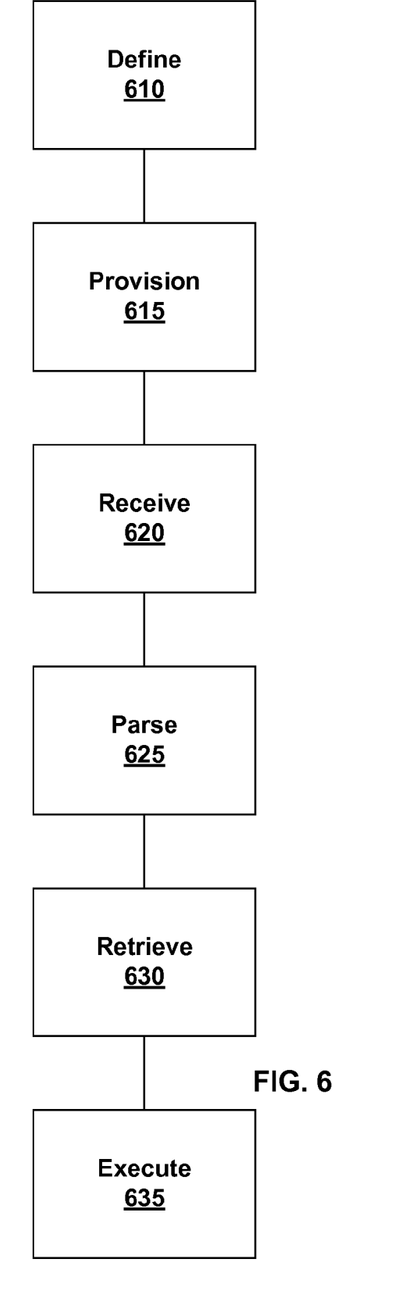
FIG. 6 illustrates a method of interpreting a command using the computing system of FIG. 1, according to various embodiments of the invention.

FIG. 6 illustrates a method of interpreting a command using the computing system of FIG. 1, according to various embodiments of the invention. The interpreted command may include a command line or a universal resource locator. While the steps illustrated in FIG. 6 are discussed in reference to compiled code, they may also be performed in relation to other kinds of executable code and/or data.

In an optional Define Step 610, a prefix is predefined. This predefinition may be performed by a programmer or system manager, for example, using Code Management Logic 180, Database Management Logic 150 or an editor. The predefinition typically includes specification of a label identifying the predefined prefix, and one or more data types characterizing objects. For example, a predefined prefix may include "member; string; integer; prefix". This predefined prefix includes a label "member" configured to identify the predefined prefix and match this label to the predefined prefix when the label occurs in a command. This predefined prefix further comprises data types "string" and "integer" which, in some embodiments, are configured to indicate that the next two objects should be treated as a string and an integer, respectively. This predefined prefix further comprises a type "prefix". This type is optionally used to indicate that an object should be treated as a daughter predefined prefix. In various embodiments, a predefined prefix may include a wide variety of alternative syntaxes, types, and the like.

In various embodiments, a prefix may include one or more of the following: a) a unique identifier, e.g., an integer, for the prefix; b) a string used to match the prefix; c) and an identifier, e.g., an integer or a pointer, of a parent prefix; d) a string that identifies possible objects, e.g., values, to be expected within a command and variables to assign the values; e) a string that identifies static values to be passed to executable code and variables of the executable code to assign these values; f) an enable/disable flag; g) a human readable name of the prefix; h) a key to an external database; i) a style identifier; an application identifier configured to identify one or more application to which the prefix belongs; j) a configuration parameter; k) information (e.g., an internet protocol address) relating to websites on which the prefix is available and/or may be used; and l) a human readable description of the prefix. The predefined prefixes are stored in a location accessible to Command Interpretation Logic 190, optionally in Database 140.

In an optional Provision Step 615, a computer program is provisioned on a computing device such as Database Server 310 by transferring Database 140 and a set of predefined prefixes to the computing device.

In a Receive Step 620, a command is received by Computing System 100. This command includes a plurality of objects, for example, a predefined prefix, a value, a map, and/or the like. Typically the command includes a command line or a universal resource locator, or the like. In some embodiments the command is received via a browser and/or a network such as Network 120B.

In a Parse Step 625, the command received in Receive Step 620 is parsed using Command Interpretation Logic 190. As discussed elsewhere herein, this parsing can include identification of predefined prefixes, maps, values, and/or other objects within the received command. Parse Step 625 includes generation of one or more queries, using Code Execution Logic 160, based on one or more objects identified in Parse Step 625. In some embodiments a map identified within the received command is included as a search term in one of the queries.

In a Retrieve Step 630, compiled code is retrieved from a Data Record 210 of Database 140 using the one or more queries generated in Parse Step 625. This retrieval is typically performed using Database Management Logic 150. For example, in some embodiments, different parts of the compiled code of a computer program are retrieved from different members of Data Records 210 using the queries generated in Parse Step 625. Parse Step 625 and/or Retrieve Step 630 may be performed in response to receiving an initial request from a user, or may be performed before receiving the request. If performed before receiving the request, the compiled code is cached for execution when the request is received.

In an Execute Step 635, the compiled code retrieved in Retrieve Step 630 is executed, for example using Operating System Logic 130. This execution is normally external to Database Management Logic 150. For example, the execution may include passing the compiled code from Database Management Logic 150 to Operating System Logic 130 where it is executed on Computing Device 110.

Figure 7:
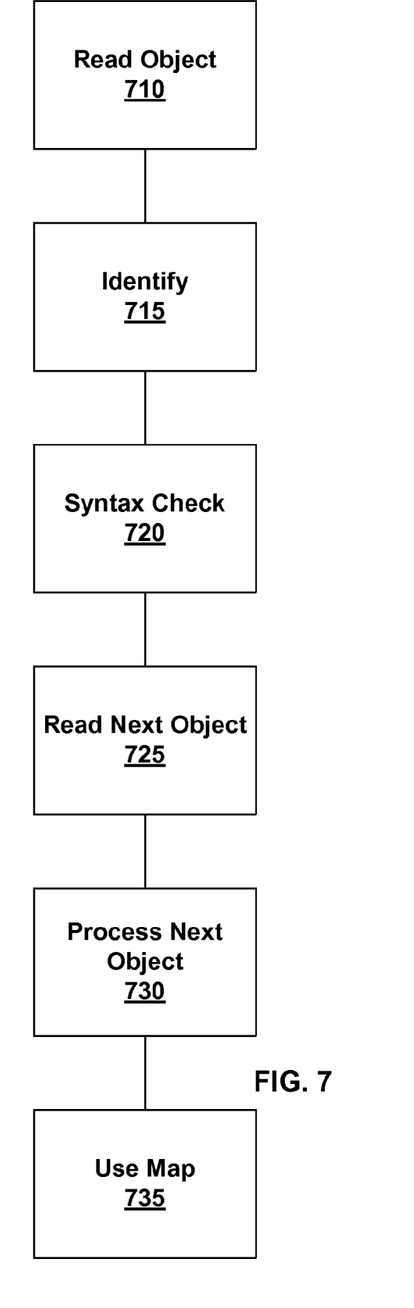
FIG. 7 illustrates a method of parsing a command, according to various embodiments of the invention.

FIG. 7 illustrates a method of parsing a received command, according to various embodiments of the invention. This process is typically performed using Command Interpretation Logic 190.

In a Read Object Step 710 a first object within a received command is read. In various embodiments the command is read from right to left or left to right. Objects within the command may be separated by a "/", "\", ".", ";" or other suitable character.

In an Identify Step 715 the object read in Read Object Step 710 is identified as a value, predefined prefix and/or map. Predefined prefixes are identified by comparing the read object with a set of predefined prefixes stored in Computing System 100. This storage is normally prior to the receipt of the command. In some embodiments, the read object is by default identified as a map if not identified as either a value object or a predefined prefix. If a predefined prefix has already been identified (for example in a prior rendition of Identify Step 715), then Identify Step 715 may be responsive to this predefined prefix. For example, if the predefined prefix characterizes a next object as a value object and the read object is the next object, then the object is identified as a value object.

In an optional Check Syntax Step 720, the syntax of the read object is checked. For example, if the object is identified as a character or a floating point value, the object is checked for having a syntax conforming to these types, respectively. Check Syntax Step 720 is optionally performed at other times during the method illustrated in FIG. 7. Check Syntax Step 720 may be applied on an individual basis to objects or grammatical phrases within the received command. As such, Check Syntax Step 720 may be repeated after further objects are read from the command.

In a Read Next Object Step 725, a next object within the received command is read. Typically, this next object will be one adjacent to the previously read object in the command.

In a Process Next Object Step 730, the object read in Read Next Object step 725 is processed using Command Interpretation Logic 190. This processing includes identification of the object and may be dependent on a previously read predetermined prefix. For example, if the object identified in Identify Object Step 715 is a predefined prefix that characterizes the next object as a character, then in Process Next Object Step 730 the object read in Read Next Object Step 725 is automatically identified as a character. Read Next Object Step 725 and Process Next Object Step 730 are typically repeated until the entire received command is processed.

In an optional Use Map Step 735 a map object identified in an Identify Step 715 or Process Next Object Step 730 is passed to Code Execution Logic 160 for use in generating a database query. As discussed elsewhere herein, this map may be used to select executable code, such as compiled code, from within Database 140. The map object may be passed to Code Execution Logic 160 in combination with other objects identified in the command. For example, the map object may be combined with a text string, an integer, or some other type of object and the combination may be used by Code Execution Logic 160 to generate the database query. Use Map Step 735 may occur at other times within the method illustrated by FIG. 7. For example, use Map Step 735 may be performed once a map object is identified and then repeated when a second map object is identified. In Use Map Step 735 compiled code identified by a map object may be executed or may be passed as a parameter to another piece of compiled code.

Figure 8:
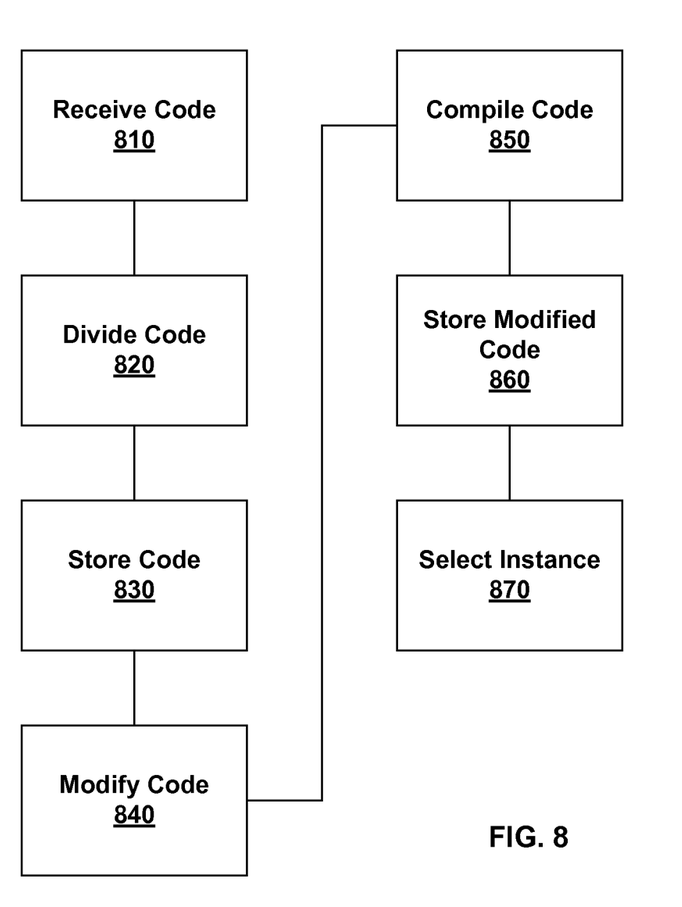
FIG. 8 illustrates a method of storing multiple instances of computing code, according to various embodiments of the invention.

FIG. 8 illustrates a method of storing multiple instances of computing code, according to various embodiments of the invention. In this method parts of a computer program are stored in separate records of Database 140, one or more of these parts are modified to create modified instances of the parts, Code Management Logic 170 is then used to select between the modified or original instances at a time of execution and/or provisioning of the computer program.

In a Receive Code Step 810, computing code is received by Computing System 100. The received code may include source code, executable code, configuration data, and/or other information. In some embodiments, the code is received as a single file, for example via Network 120. Alternatively, the code may be received in a piecemeal fashion, for example as it is typed in by a user. In some embodiments, the code is received via an editing interface presented in a browser. Receive Code Step 810 may occur over time.

In a Divide Code Step 820, the code received in Receive Code Step 810 is divided into separate parts for storage in Records 210, each part being stored in a different member of Records 210. This step may include parsing the code to determine division points. As discussed elsewhere herein, code may be divided using a variety of approaches including but not limited to dividing code by functions (procedures), by class definition, by statement hierarchy, by line, by program flow branching, or the like. For example, in some embodiments each function of the computer program is stored in a separate member of Records 210. In some embodiments, the highest statement hierarchy within a function is used to divide parts of the received code. For example, the use of WHILE statements, CASE statements, or IF statements may create a hierarchical structure wherein sub-statements within one of these statements are at a lower hierarchical level. The received code may be divided at the hierarchical level including the WHILE, CASE and IF statements.

In some embodiments, the division of code in Divide Code Step 820 is under the control of a user. For example, a user may specify through and editor, or similar interface how code is to be divided. This specification may be facilitated by placement, by a user, of markers within source code. Code Management Logic 180 is optionally configured to use these markers to identify places wherein the source code may be divided. Further, Code Compilation Logic 170 is optionally configured to use these markers while compiling the source code to divide the resulting compiled code. The markers are optionally placed within text that would otherwise be interpreted as a comment within the programming language of the source code.

In some embodiments the received code is divided depending on how it is received. For example, if the code is received as parts in a piecemeal fashion, it may be divided according to these parts.

Source code and compiled code generated from the source code may or may not be stored using the same divisions. For example, the source code may be divided and the compiled code may be divided at the same points as the source code. Alternatively, the source may not be divided, e.g., it may be stored as a single file, and compiled code resulting from compilation of the source code may be divided. Finally, in some embodiments the source code is divided but the compiled code is divided differently. This may occur, for example, where the division is dependent on program flow determined during the compilation process.

In a Store Code Step 830, the code received in Receive Code Step 810 and divided in Divide Code Step 820 is stored within Database 140. Each divided part of the code is stored in a separate member of Records 210. Typically, the storage is accomplished using Database Management Logic 150 and may occur over Network 120. Receive Code Step 810, Divide Code Step 820 and Store Code step 830 are optionally performed more than once to process multiple parts of a computer program.

In a Modify Code Step 840, a modified instance of one or more parts of the code stored in Store Code Step 830 is produced. This modification may include editing of source code, replacement or recompiling of compiled code, and/or the like. For example, in some embodiments, source code stored in Store Code Step 830 is retrieved from Database 140 using a query. The source code is then edited by a user, optionally via a browser interface. In some embodiments, Modify Code Step 840 includes modifying compiled code. For example, source code may be modified and then recompiled to generate modified compiled code. The same source code may be compiled in a different manner, e.g., with different compiler settings, to generate modified compiled code.

In an optional Compile Code Step 850 source code modified in Modify Code Step 840 is compiled using Code Compilation Logic 170. Compile Code Step 850 is unnecessary when the modified code is already in a compiled form, or when a compiled form of the code is not needed.

In a Store Modified Code Step 860, the modified code produced in Modify Code Step 840, and optionally Compiled in Compile Code Step 850, is stored in one or more of Records 210. The modified code is optionally stored as a separate instance of the original code. Store Modified Code step 860 may include setting a value in a field of Records 210 to distinguish different instances of the code. The storage is typically performed using Database Management Logic 150.

In a Select Instance Step 870, a selection among the different instances of the code, e.g., the original instance and the instance produced in Modify Code Step 840, is made. This selection may be in response to a request to access and/or execute the code. Optionally, the selection is made using a database query and Database Management Logic 150. The selected instance is optionally executed using Operating System Logic 130.

Several embodiments are specifically illustrated and/or described herein. However, it will be appreciated that modifications and variations are covered by the above teachings and within the scope of the appended claims without departing from the spirit and intended scope thereof. For example, the various logic discussed herein may comprise hardware, firmware and/or software stored on a computer readable media. Different parts of a computer program are optionally stored within different tables of Database 140. For example, where a computer program comprises multiple source files and/or object files, each of these may be stored in a separate table. The compiled code discussed herein is optionally configured for execution within a browser. The various embodiments discussed herein may be applied to web or non-web applications. The compiled code discussed here may be executed on a virtual machine. Likewise, various components of Computing System 100 may include virtual machines. Objects within a received command may be used to retrieve information other then compiled code from Database 140, for example, style sheets, static data, or the like. The term pre-defined prefix discussed herein may alternatively be a suffix. Various embodiments of the invention comprise a graphical user interface configured to specify map objects, prefixes, or the like. For example, a graphical user interface may be used for selecting target code to be executed according to a given map.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A non-transitory computer readable medium having stored thereupon:
    logic configured to receive a code of a computer program;
    logic configured to divide the code into a plurality of parts;
    logic configured to store the plurality of parts, each in a separate record of a database;
    logic configured to modify a member of the plurality of parts to produce a modified instance of the member from an original instance of the member;
    logic configured to store the modified instance in the database; and
    logic configured to alternatively select the original instance or the modified instance using a database query.

2. The computer readable medium of claim 1, wherein the code of the computer program comprises source code.

3. The computer readable medium of claim 2, further comprising logic configured to compile each of the plurality of parts and logic configured to store each of the compiled parts in a separate record of the database.

4. The computer readable medium of claim 1, wherein the code of the computer program comprises compiled code.

5. The computer readable medium of claim 1, further comprising logic configured to use a logging feature of a database management program to manage the original instance and the modified instance.

6. The computer readable medium of claim 1, further comprising logic configured to restore the original instance using a roll-back feature of a database management program.

7. The computer readable medium of claim 1, further comprising logic configured to control access to the code using a database management program.

8. A system comprising:
    a computing device configured to execute a computer program using operating system logic;
    a database stored on a computer readable media and including data records configured to store compiled code of the computer program as separate parts;
    database management logic configured for accessing the database; and
    scheduling logic external to the computer program and configured to request execution of a subset of the separate parts on the computing device according to a schedule.

9. The system of claim 8, wherein the scheduling logic is executed on a device separate from the computing device.

10. The system of claim 8, wherein the scheduling logic is configured to request the execution on a function-by-function basis.

* * * * *